E. I. DODDS.
STAY BOLT.
APPLICATION FILED SEPT. 21, 1912.
1,086,145.
Patented Feb. 3, 1914.
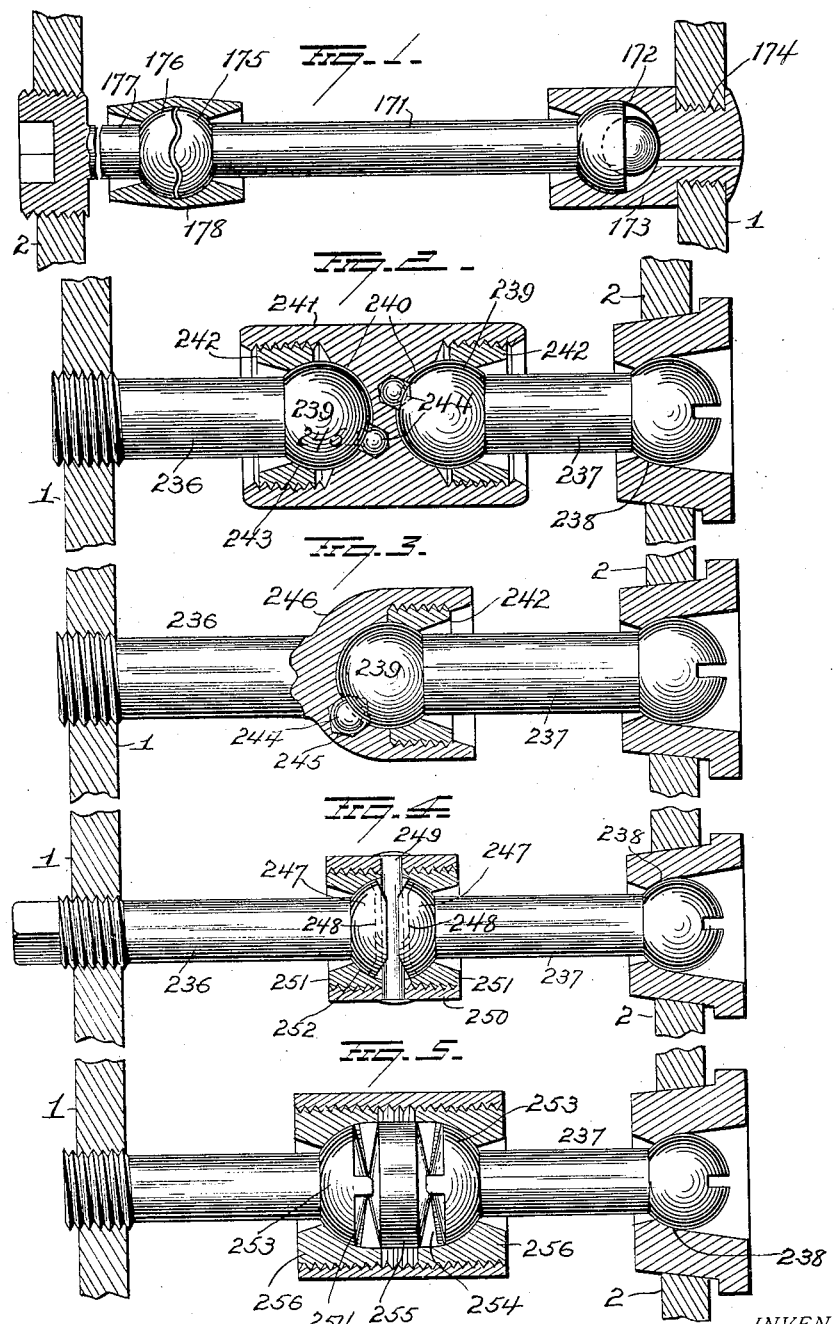
WITNESSES
INVENTOR

UNITED STATES PATENT OFFICE.

ETHAN I. DODDS, OF CENTRAL VALLEY, NEW YORK, ASSIGNOR, BY MESNE ASSIGNMENTS, TO FLANNERY BOLT COMPANY, OF PITTSBURGH, PENNSYLVANIA.

STAY-BOLT.

1,086,145. Specification of Letters Patent. Patented Feb. 3, 1914.

Original application filed September 25, 1911, Serial No. 651,051. Divided and this application filed September 21, 1912. Serial No. 721,675.

*To all whom it may concern:*

Be it known that I, ETHAN I. DODDS, a citizen of the United States, residing at Central Valley, in the county of Orange and State of New York, have invented certain new and useful Improvements in Stay-Bolts; and I do hereby declare the following to be a full, clear, and exact description of the invention, such as will enable others skilled in the art to which it appertains to make and use the same.

This invention relates to flexible bolts such as are employed for connecting the outside and inside plates of locomotive and other boilers, and is a division of application Serial Number 651,051, filed September 25th, 1911.

The object of the invention is to provide an improved stay bolt capable of a universal angular movement or yield, so that the stay-bolt will be relieved of any vibration due to the expansion of the fire-box and crown sheets, and permitting the sheets to expand and contract at will.

Another object of the invention is to provide a stay-bolt that can readily be applied from the inside without the trouble and expense of dismantling the engine, and can be adjusted at any time, if necessary.

Another object is to so connect all the parts of the bolt and its connectors that the bolt can, after parts have been assembled, be applied to both plates through an opening in one of the walls or plates of the boiler.

In the accompanying drawings, Figures 1, 2, 3, 4 and 5 are views partly in section and partly in elevation showing several forms of couplings connecting the two sections of the bolt.

The several figures show bolts, each made up of parts so connected, that after they have been assembled, the bolt as a whole may be entered and secured through a hole in one wall or plate of the boiler, and flexibly connect the two walls or plates of the boiler.

In Fig. 1, I show a structure in which a solid shank 171 is at one end entered into a ball shaped socket 172 formed in a connector block 173 attached to the wall 1 and is expanded therein by heating and driving it endwise against a ball 174 in said socket, until it forms a rocking fit with the concave wall of the socket 172. The opposite end of the bolt shank has a hemispherical enlargement 175 provided with a series of radial teeth which intermesh or coöperate with similar teeth on the hemispherical head 176 of the connector 177 secured to the wall 2 of the boiler. The two hemi-spherical heads are provided with intermeshing teeth or projections which permit of a semi-rotary and angular movement of each part relative to the other, and the heads are connected, and held in intermeshing contact by the sleeve 178, into which they are entered and in which they are secured by swaging the ends of the sleeve down over the heads as shown.

Figs. 2, 3, 4 and 5 illustrate different ways of forming an intermediate universal joint connection between two bolt sections that are connected at their outer ends to the respective walls 1 and 2. In all of these views 236 and 237 represent the bolt sections which may be connected at their outer ends to the walls 1 and 2, by the means illustrated or by any other approved means, at least one of the sections preferably having a swiveled or ball and socket connection as shown at 238.

In Fig. 2 the bolt sections 236 and 237 are formed with the ball-heads 239 that engage seats 240 formed in a sleeve connection 241, this latter being internally threaded at its ends for the attachment of the washers 242, that are likewise formed with concave annular seats 243, to engage the ball heads 239 and lock them within the ends of the connector 241. Both heads have lost motion connection with the sleeve 241, to facilitate rotative movement in assembling, which consists of balls 244, engaging sockets 245, formed partly in the heads 239 and partly in the sleeves, the sockets being larger than the balls so as to provide for the necessary flexibility between the sleeve and the bolt sections.

In Fig. 3 a central swiveled joint is secured in a somewhat simpler manner, forming, in effect, half of the sleeve 241 of Fig. 2, integral with the bolt section 236, giving it the form of a socketed head 246 receiving the ball head 239 of the bolt section 237, said ball head being held within the socket by the washer 242 and locked, with capacity for limited motion by the ball 244 and socket 245.

In Fig. 4 I show a construction in which the bolt sections 236 and 237 are formed with hemi-spherical heads 247 on their meeting ends, the proximate ends of said heads being convex and formed with diametric grooves or channels 248, that engage a pin 249 passed through or surrounding sleeve 250. The heads are confined within the sleeve 250, by the washers 251, threaded into the outer ends of the sleeve and formed with seats 252 engaging the convex surfaces of the heads 247.

Fig. 5 shows a modification of Fig. 4 wherein the heads 253 of the bolt sections 236 and 237 are formed on their proximate faces with radial teeth 254 that form a lost motion driving connection with an intermediate idler gear 255 disposed between the heads 253, the parts being confined by washers as in Fig. 4.

It is evident that many slight changes might be resorted to in the relative arrangement of parts shown and described without departing from the spirit and scope of my invention as set forth in the claims annexed. Hence I would have it understood that I do not wish to confine myself to the exact construction and arrangement of parts shown and described, but Having fully described my invention what I claim as new and desire to secure by Letters-Patent, is:—

1. A stay bolt comprising a two part bolt, a coupling flexibly connecting the said parts of bolt, means for limiting the relative rotary movement of said bolt parts independently of each other, and a universal joint connection between one section of the bolt and the wall to which it is attached.

2. A stay bolt comprising a two part bolt, a coupling for detachably connecting the two parts of the bolt and permitting relative rotary movement thereof, and means within the coupling for limiting the relative rotary movement of said bolt parts independently of each other.

3. A stay bolt comprising a two part bolt, a coupling and means detachably connecting the two parts of the bolt and permitting relative rotary movement thereof, and means for limiting the relative rotary movement of said bolt sections.

4. A stay bolt comprising two bolt sections, a coupling, means for detachably connecting said coupling to the bolt heads and permitting relative rotary movement thereof, and means within the coupling and engaging the bolt heads for limiting the relative rotary movement of said bolt sections independently of each other.

5. A stay bolt comprising two bolt sections, a coupling, means for detachably connecting said coupling to the bolt heads and permitting relative rotary movement thereof, and means within and engaging the coupling and bolt heads for limiting the relative rotary movement of said bolt sections independently of each other.

6. A stay bolt comprising two bolt sections, a coupling embracing the heads of both bolt sections and permitting relative rotary movement thereof and a single means within the coupling and engaging both bolt heads for limiting the relative rotary movement of said bolt sections independently of each other.

7. A stay bolt comprising two bolt sections, a coupling embracing the heads of both sections and permitting relative rotary movement thereof, means for detachably securing the bolt sections to the coupling and a single means within the coupling and engaging both bolt heads for limiting the relative rotary movement of said bolt sections independently of each other.

8. A stay bolt comprising two bolt sections, a coupling embracing the heads of both sections and permitting relative rotary movement thereof, means for detachably securing the bolt sections to the coupling and a single means secured to the coupling and engaging both bolt heads for limiting the relative rotary movement of said bolt sections independently of each other.

9. In a stay bolt of the class described, a sleeve formed with a socket at each end and a pair of bolts formed with rounded heads loosely fitting into said sockets, one of said heads being formed with a notch and the other of said heads being formed with a projection fitting into said notch and each of said bolts being formed with retaining means positioned near the ends opposite said heads.

In testimony whereof, I have signed this specification in the presence of two subscribing witnesses.

ETHAN I. DODDS.

Witnesses:
A. W. BRIGHT,
GEO. F. DOWNING.

Copies of this patent may be obtained for five cents each, by addressing the "Commissioner of Patents Washington, D. C."